(12) United States Patent
Adams

(10) Patent No.: US 7,677,165 B2
(45) Date of Patent: Mar. 16, 2010

(54) FOOD STORAGE DEVICE

(76) Inventor: Spencer Adams, 6500 7 Lakes Village, West End, NC (US) 27376

( * ) Notice: Subject to any disclaimer, the term of this patent is extended or adjusted under 35 U.S.C. 154(b) by 515 days.

(21) Appl. No.: 11/560,178

(22) Filed: Nov. 15, 2006

(65) Prior Publication Data

US 2008/0110521 A1    May 15, 2008

(51) Int. Cl.
*A23L 1/00* (2006.01)
(52) U.S. Cl. .............................. 99/468; 99/472; 99/476; 141/65; 219/401
(58) Field of Classification Search ........... 99/467–476, 99/485–489, 516, 483, 330; 141/65; 422/121, 422/292, 28, 29, 37, 189–190; 62/56, 78, 62/132, 252, 331, 441, 335, 272; 165/185–186; 426/321–326, 118, 395; 312/116, 236; 219/400, 219/401
See application file for complete search history.

(56) References Cited

U.S. PATENT DOCUMENTS

| | | | |
|---|---|---|---|
| 4,961,322 A * | 10/1990 | Oguma et al. ................... 62/179 |
| 4,984,611 A * | 1/1991 | Takatsuki et al. ............. 141/65 |
| 5,195,427 A * | 3/1993 | Germano ...................... 99/472 |
| 5,235,903 A * | 8/1993 | Tippmann ..................... 99/331 |
| 5,394,789 A * | 3/1995 | Evans et al. ................... 99/345 |
| 5,570,628 A * | 11/1996 | Kiener et al. .................. 99/472 |
| 5,806,575 A * | 9/1998 | Tsay ............................. 141/65 |
| 5,964,255 A | 10/1999 | Schmidt |
| 5,983,830 A * | 11/1999 | Cox et al. ..................... 119/6.8 |
| 6,148,875 A * | 11/2000 | Breen ........................... 141/65 |
| 6,971,418 B2 | 12/2005 | De Costa |
| 7,040,356 B2 * | 5/2006 | Tarlow ......................... 141/65 |
| 7,325,409 B2 * | 2/2008 | Espinosa ........................ 62/78 |
| 2008/0118395 A1 * | 5/2008 | Benedek ........................ 422/4 |
| 2008/0230143 A1 * | 9/2008 | Swanson ...................... 141/65 |

* cited by examiner

*Primary Examiner*—Timothy F. Simone
(74) *Attorney, Agent, or Firm*—Dale J. Ream

(57) ABSTRACT

A food storage device includes a housing defining an interior area accessible through a door coupled to the housing. The food storage device includes a vacuum pump in communication with the interior area for selectively removing air from the housing. A pressure activated switch is in communication with the vacuum pump and interior area for selectively actuating the pump. A humidifier is also positioned relative to the interior area for maintaining that area at a predetermined humidity level. A humidity sensor communicates with the humidifier for selectively actuating the humidifier to add moisture to the interior area so as to maintain a desired humidity level. The food storage includes a pressure equalizing valve in communication with the housing interior area and with an area external to the housing for equalizing a pressure inside the interior area with a pressure outside the housing.

16 Claims, 5 Drawing Sheets

FOOD STORAGE DEVICE

BACKGROUND OF THE INVENTION

The present invention relates to kitchen appliances and, more particularly, to a food storage device for keeping bread or similar items fresh.

Bread becomes dry and stale when kept in an otherwise dry or humid environment. Not only is dry or stale bread undesirable to eat, it is frustrating trying to keep it fresh long enough to avoid such an occurrence. While refrigerators are sometimes equipped with "crisper" bins to keep vegetables fresh, similar devices for keeping bread fresh are not as commonly available.

Various devices have been proposed in the art for keeping food items fresh, such as vacuum sealed bags. While assumably effective for their intended purposes, these are not practical for preserving bread or other soft or delicate foods. Other devices have been proposed for keeping bread in a vacuum secured container. Again, while these proposals are presumably effective, they still lack the capability to maintain a desired humidity and pressure or to provide safety precautions.

Therefore, it would be desirable to have a food storage device for storing bread in a vacuum environment under predetermined pressure and moisture conditions. Further, it would be desirable to have a food storage device that releases pressure at a predetermined level and also when the door to the device is opened. In addition, it is desirable to have a food storage device having a construction that is strong enough not to compress or otherwise damage food or be damaged under high pressure.

SUMMARY OF THE INVENTION

Accordingly, a food storage device according to the present invention includes a housing defining an interior area that is accessible through a door that is coupled to the housing. The food storage device includes a vacuum pump in communication with the interior area for selectively removing air from the housing. It should be understood that references in this application to "pressure," "high pressure," or even "negative pressure," will be understood by those of ordinary skill in the art to be in the context of a vacuum pump that removes air from a sealed environment so as to reduce the air pressure within that environment in comparison to normal ambient air pressure. The degree of reduction may be regulated, as will be described below, so as to achieve desirable characteristics as well as to maintain safety of the housing.

In addition, a pressure activated switch is in communication with the vacuum pump and interior area for selectively actuating the pump to maintain a consistent pressure therein. A humidifier may also be positioned relative to the interior area for maintaining that area at a predetermined humidity level. A humidity sensor is in communication with the interior area and the humidifier for selectively actuating the humidifier to add moisture to the interior area so as to maintain a desired humidity level.

The food storage device also includes a pressure equalizing valve in communication with the housing interior area as well as with an area external to the housing for selectively equalizing a pressure inside the interior area with a pressure outside the housing. Once the pressure inside and outside the housing has been equalized, the door is more easily opened. Circuitry is provided such that the vacuum pump is inoperable when the pressure equalizing valve is actuated.

Therefore, a general object of this invention is to provide a food storage device for keeping bread and similar delicate foods fresh for longer periods of time.

Another object of this invention is to provide a food storage device, as aforesaid, that maintains freshness in a vacuum environment.

Still another object of this invention is to provide a food storage device, as aforesaid, that maintains a predetermined level of humidity to keep bread moist and fresh.

Yet another object of this invention is to provide a food storage device, as aforesaid, that selectively equalizes the interior and exterior pressure relative to the housing so that the housing door may be opened easily.

A further object of this invention is to provide a food storage device, as aforesaid, having a construction that is not damaged even when a strong vacuum is actuated.

A still further object of this invention is to provide a food storage device, as aforesaid, that is easy to use and economical to manufacture.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

A food storage device 100 according to the present invention will now be described in detail with reference to FIGS. 1 through 6 of the accompanying drawings. More particularly, a food storage device 100 according to the current invention includes a housing 110, a door 117, and a vacuum pump 120.

Figure 1:
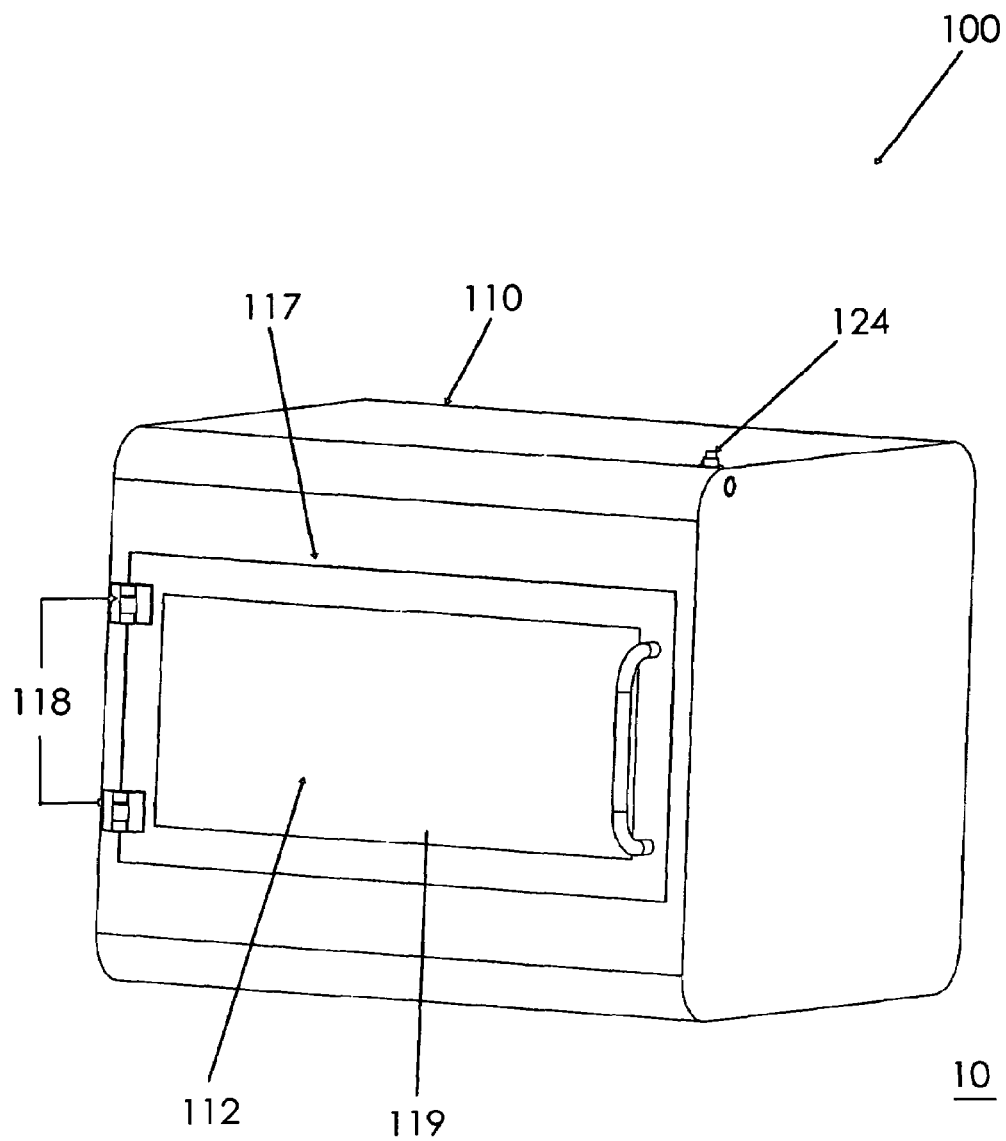
FIG. 1 is a perspective view of a food storage device according to a preferred embodiment of the present invention.
Figure 2:
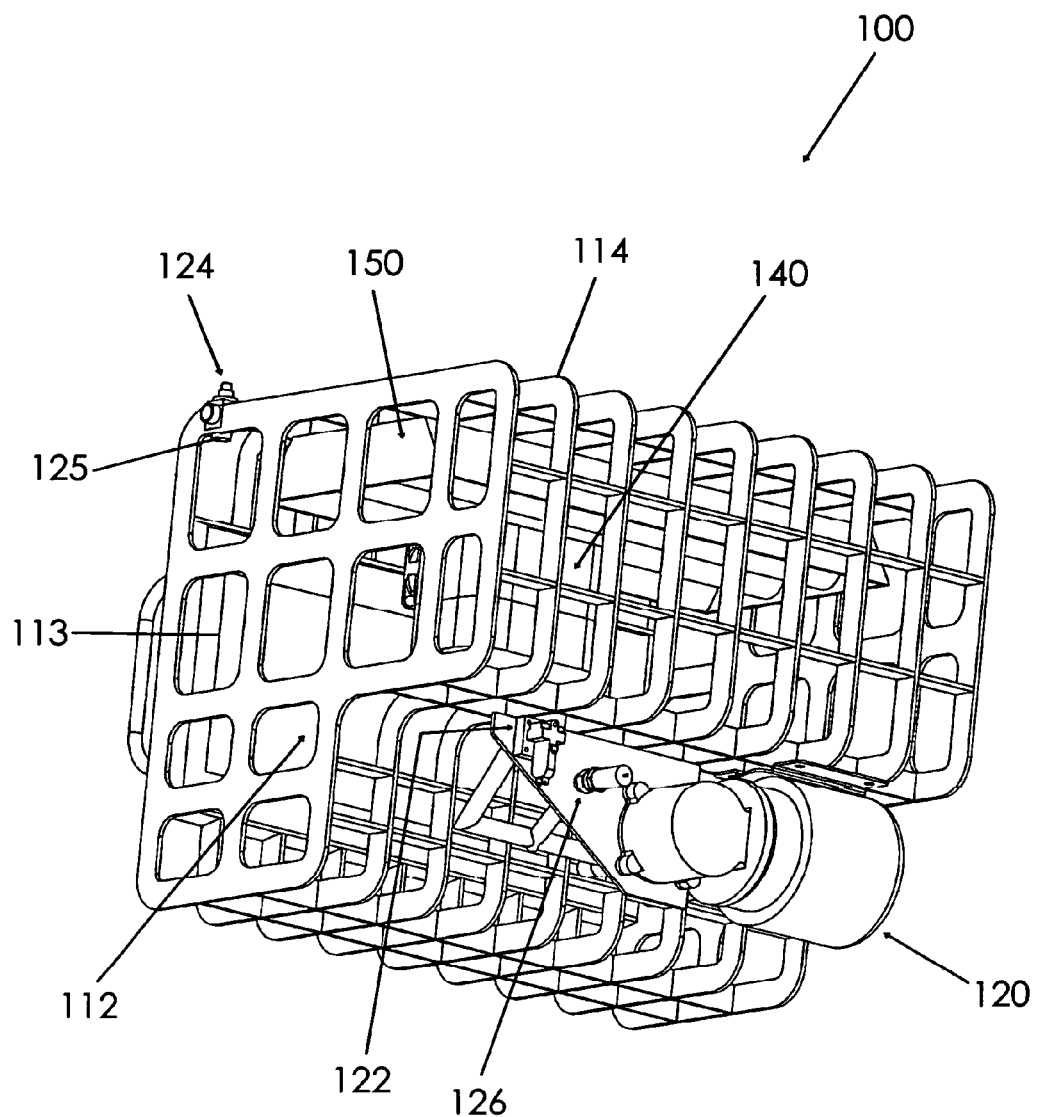
FIG. 2 is a perspective view of a rib structure of the housing as in FIG. 1.
Figure 3:
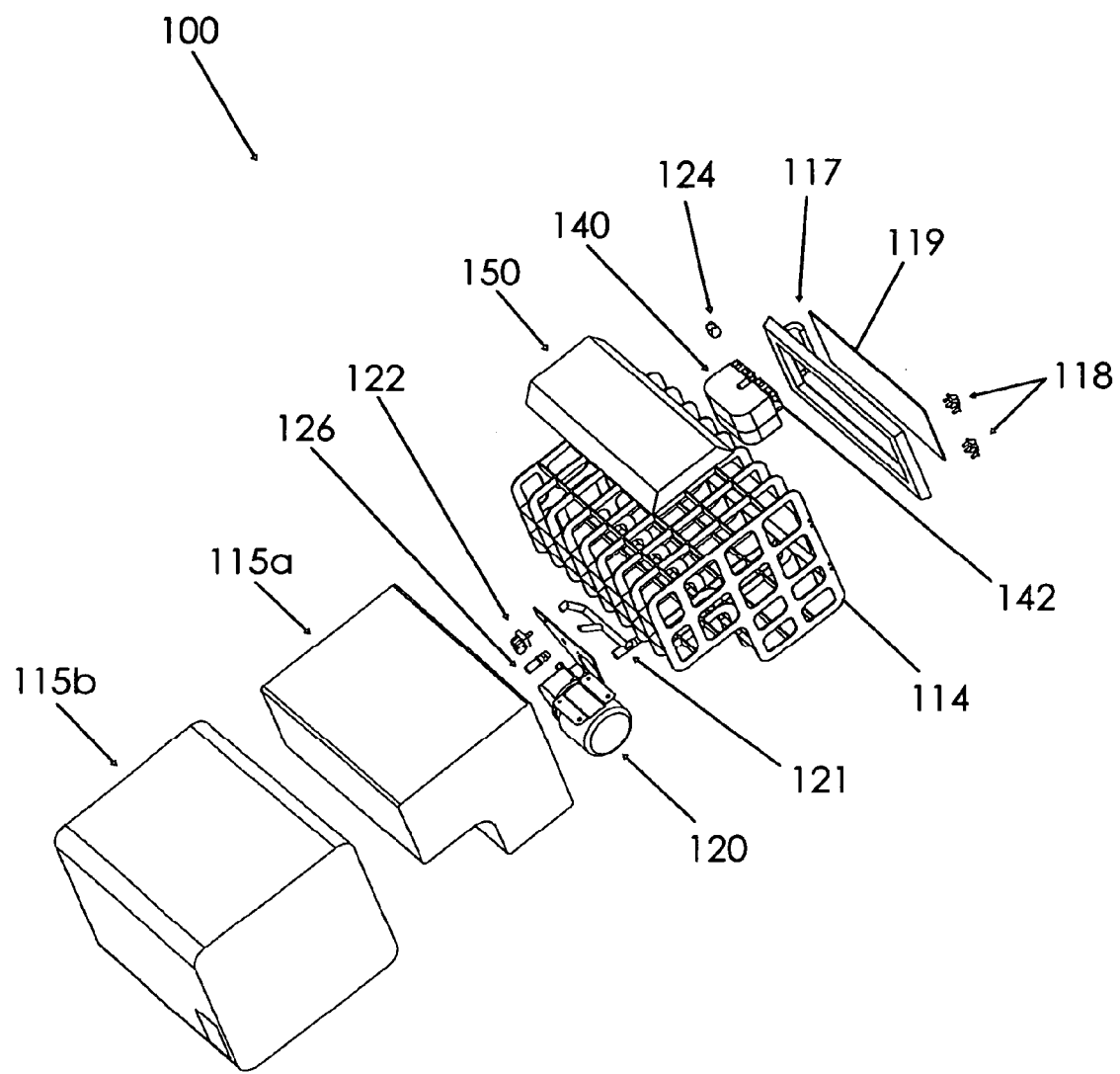
FIG. 3 is an exploded view of the food storage device as in FIG. 1
Figure 4:
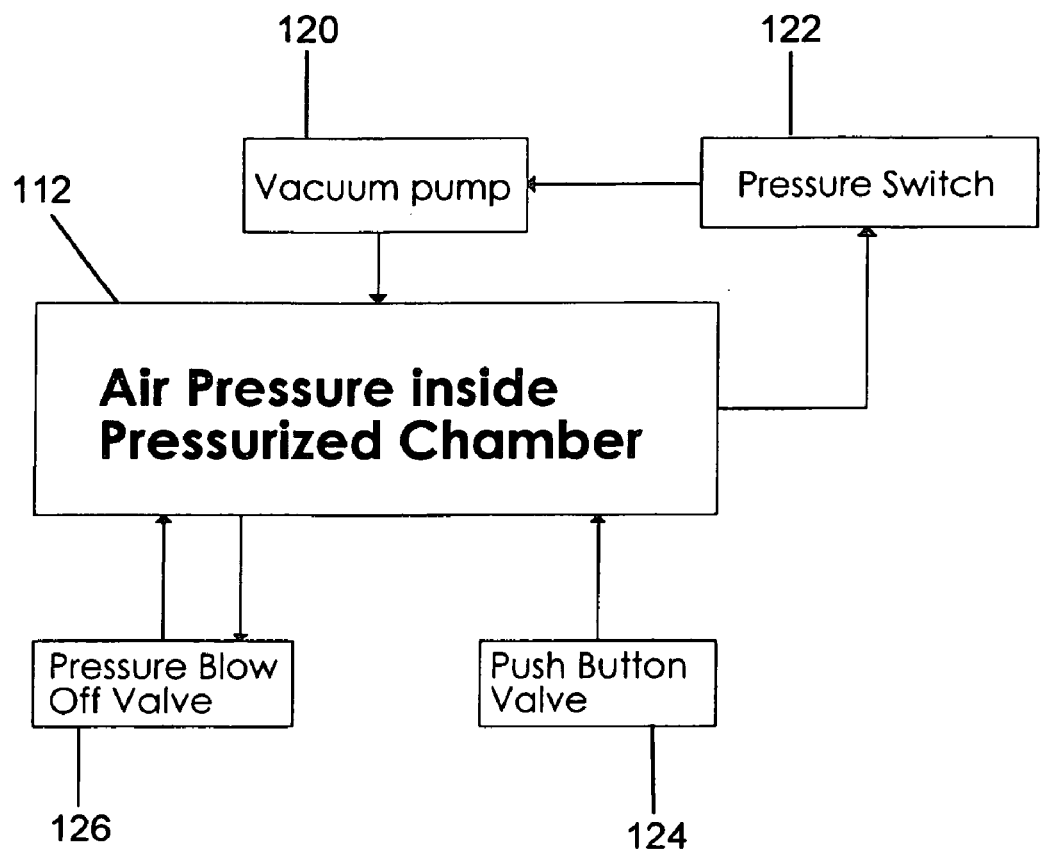
FIG. 4 is a block diagram of the mechanical components of the food storage device.

The housing 110 defines an interior area 112 and an access opening 113 (FIGS. 1 and 2). As shown in FIG. 3, the housing 110 may include a plurality of ribs 114 sandwiched between an interior wall 115a and an exterior wall 115b; the interior wall 115a may define the interior area 112. The ribs 114 and the walls 115a, 115b may collectively provide a light-weight structure having high strength properties, though other configurations may be used.

The door 117 is operatively coupled to the housing 110 for selectively covering the access opening 113 and enclosing the interior area 112. For example, the door 117 may be hingedly coupled (e.g., using hinges 118 shown in FIGS. 1 and 3) or slidably coupled to the housing 110. More particularly, the door 117 may be movable between a closed configuration (FIG. 1) enclosing the interior area 112 and an open configuration (not shown) allowing access to the interior area 112. The door 117 may include a transparent window 119 to allow a user to view the interior area 112 while the door 117 is at the closed configuration.

The vacuum pump 120 (FIGS. 2 through 4) is in communication with the interior area 112 (e.g., via vacuum tubing 121 shown in FIG. 3) to selectively remove air from the interior area 112. A pressure activated switch 122 (FIGS. 2 through 4) may be in communication with the interior area 112 and the vacuum pump 120 to selectively actuate the vacuum pump 120 to maintain the interior area 112 at a given pressure. Means for selecting the given pressure, such as a dial, a keypad, or another input device in communication with the pressure activate switch 122, may be included.

A pressure equalizing valve 124 (FIGS. 1 through 4) may be in communication with the interior area 112 and an area 10 external to the housing 110 to selectively equalize a pressure inside the interior area 112 with a pressure outside the interior area 112. The pressure equalizing valve 124 may be operatively accessible to a user when the door 117 is at the closed configuration. The pressure equalizing valve 124 may include a solenoid 125 (FIG. 2), or a simple channel manually exposed by a switch or button may alternately be used. A relief valve 126 may be in communication with the interior area 112 and the area 10 external to the housing 110 for automatically equalizing the pressure inside the interior area 112 with the pressure outside the interior area 112 when the interior area reaches a predetermined maximum pressure.

Figure 5:
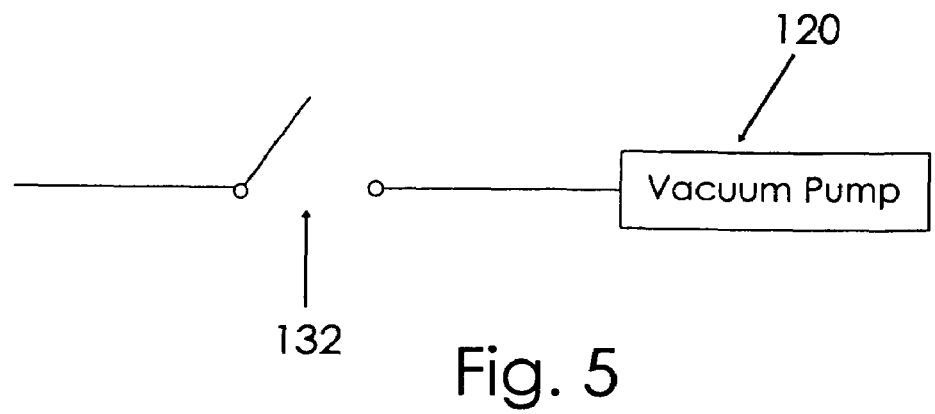
FIG. 5 is a schematic diagram of a one circuit-breaking switch.
Figure 6:
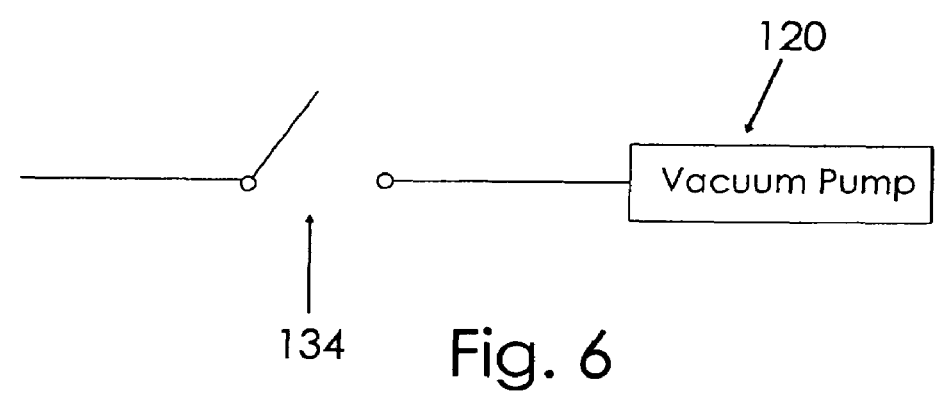
FIG. 6 is a schematic diagram of another circuit-breaking switch.

As shown in FIG. 5, a circuit-breaking switch 132 may be in communication with the vacuum pump 120 and the pressure equalizing valve 124 for rendering the vacuum pump inoperable while the pressure equalizing valve 124 is actuated. As shown in FIG. 6, a circuit-breaking switch 134 may be in communication with the vacuum pump 120 and the door 117 to render the vacuum pump inoperable while the door 117 is at the open configuration.

A humidifier 140 may be in communication with the interior area 112 to selectively maintain the interior area 112 at a given humidity level. Means for selecting the given humidity level, such as a dial, a keypad, or another input device in communication with the humidifier 140, may be included. A humidity sensor 142 (FIG. 3) may be in communication with the interior area 112 and the humidifier 140 to selectively actuate the humidifier 140 to maintain the interior area 112 at the given humidity level.

FIG. 3 shows an ultraviolet light 150 that may be located inside the housing 110 for killing germs inside the housing 110 (and more particularly inside the interior area 112). The ultraviolet light 150 may be fixedly attached to the housing 110 or removably attached to the housing 110.

In use, an article of food, such as a loaf of bread, is placed in the interior area 112 of the food storage device 100. The door 117 is then moved to the closed configuration, and the vacuum pump 120 removes air from the interior area 112. Once the interior area reaches a given pressure, the pressure activated switch 122 deactivates the vacuum pump 120. The humidifier 140 may introduce humidity to or remove humidity from the interior area 112 to maintain a given humidity level in cooperation with a humidity sensor 142. In other words, if the humidity sensor 142 senses too little humidity, the humidifier 140 may be activated to introduce humidity into the interior area 112; if the humidity sensor 142 senses too much humidity, the humidifier 140 may be activated to remove humidity from the interior area 112. By maintaining the interior area 112 at a given pressure and humidity, the article of food may be better preserved; the article of food may be kept "fresher" for longer periods of time than would otherwise be the case. In addition, the ultraviolet light 150 may be activated to kill germs inside the interior area 112 and further extend the longevity of the article of food.

To remove the article of food from the interior area 112 of the food storage device 100, the pressure equalizing valve 124 may be actuated to equalize the pressure inside the interior area 112 with the pressure outside the interior area 112 as described above. By equalizing the pressures, the door 117 may be more readily moved from the closed configuration to the open configuration. The circuit-breaking switch 132 may keep the vacuum pump 120 from being actuated while the pressure equalizing valve 124 is actuated. Once the door 117 is at the open configuration, the circuit-breaking switch 134 may keep the vacuum pump 120 from being actuated until the door 117 is returned to the closed configuration. After the door 117 is returned to the closed configuration, the pressure activated switch 122 may again activate and deactivate the vacuum pump 120 as described above.

If the pressure activated switch 122 or the vacuum pump 120 were to malfunction, the relief valve 126 may automatically equalize the pressure inside the interior area 112 with the pressure outside the interior area 112 once the interior area reaches a predetermined maximum pressure. As such, the relief valve 126 provides an important safety feature.

It is understood that while certain forms of this invention have been illustrated and described, it is not limited thereto except insofar as such limitations are included in the following claims and allowable functional equivalents thereof.

The invention claimed is:

1. A food storage device, comprising:
a housing defining an interior area and an access opening;
a door coupled to said housing for selectively covering said access opening and enclosing said interior area;
wherein:
said door is movable between a closed configuration enclosing said interior area and an open configuration allowing access to said interior area;
said housing includes a plurality of ribs sandwiched between an interior wall and an exterior wall, said interior wall defining said interior area;
a vacuum pump in communication with said interior area for selectively removing air from said interior area;
a pressure activated switch in communication with said interior area and said vacuum pump for selectively actuating said vacuum pump to maintain said interior area at a given pressure;
a humidifier in communication with said interior area for selectively maintaining said interior area at a given humidity level;
a humidity sensor in communication with said interior area and said humidifier for selectively actuating said humidifier to maintain said interior area at said given humidity level;
a pressure equalizing valve in communication with said interior area and an area external to said housing for selectively equalizing a pressure inside said interior area with a pressure outside said interior area, said pressure equalizing valve being operatively accessible to a user when said door encloses said interior area;
a first circuit-breaking switch in communication with said vacuum pump and said pressure equalizing valve for rendering said vacuum pump inoperable while said pressure equalizing valve is actuated;
a second circuit-breaking switch in communication with said vacuum pump and said door to render said vacuum pump inoperable while said door is at said open configuration; and
an ultraviolet light inside said housing for killing germs inside said housing.

2. The food storage device of claim 1, further comprising a relief valve in communication with said interior area and said area external to said housing for automatically equalizing said pressure inside said interior area with said pressure outside said interior area upon said interior area reaching a predetermined maximum pressure.

3. The food storage device of claim 1, wherein said door is movable between a closed configuration enclosing said interior area and an open configuration allowing access to said interior area, said food storage device further comprising:
   a pressure equalizing valve in communication with said interior area and an area external to said housing for selectively equalizing a pressure inside said interior area with a pressure outside said interior area, said pressure equalizing valve being operatively accessible to a user when said door encloses said interior area; and
   a circuit-breaking switch in communication with said vacuum pump and said door to render said vacuum pump inoperable while said door is at said open configuration.

4. The food storage device of claim 3, further comprising a relief valve in communication with said interior area and said area external to said housing for automatically equalizing said pressure inside said interior area with said pressure outside said interior area upon said interior area reaching a predetermined maximum pressure.

5. The food storage device of claim 3, wherein said pressure equalizing valve includes a solenoid.

6. The food storage device of claim 1, wherein:
   said door is at least one of hingedly coupled and slidably coupled to said housing; and
   said door includes a transparent window to allow a user to view said interior area while said door encloses said interior area.

7. The food storage device of claim 1, further comprising means for selecting said given humidity level and means for selecting said given pressure.

8. A food storage device, comprising:
   a housing defining an interior area and an access opening;
   a door coupled to said housing for selectively covering said access opening and enclosing said interior area, said door being movable between a closed configuration enclosing said interior area and an open configuration allowing access to said interior area;
   a vacuum pump in communication with said interior area to selectively remove air from said interior area;
   a pressure activated switch in communication with said interior area and said vacuum pump to selectively actuate said vacuum pump to maintain said interior area at a given pressure; and
   a relief valve in communication with said interior area and said area external to said housing for automatically equalizing said pressure inside said interior area with said pressure outside said interior area upon said interior area reaching a predetermined maximum pressure.

9. The food storage device of claim 8, further comprising:
   a pressure equalizing valve in communication with said interior area and an area external to said housing to selectively equalize a pressure inside said interior area with a pressure outside said interior area, said pressure equalizing valve being operatively accessible to a user when said door is at said closed configuration; and
   a circuit-breaking switch in communication with said vacuum pump and said pressure equalizing valve for rendering said vacuum pump inoperable while said pressure equalizing valve is actuated.

10. The food storage device of claim 8, further comprising a pressure equalizing valve in communication with said interior area and an area external to said housing to selectively equalize a pressure inside said interior area with a pressure outside said interior area, said pressure equalizing valve being operatively accessible to a user when said door is at said closed configuration.

11. The food storage device of claim 8, wherein said housing includes a plurality of ribs sandwiched between an interior wall and an exterior wall, said interior wall defining said interior area.

12. The food storage device of claim 8, further comprising an ultraviolet light inside said housing for killing germs inside said housing.

13. The food storage device of claim 8, further comprising a circuit-breaking switch in communication with said vacuum pump and said door to render said vacuum pump inoperable while said door is at said open configuration.

14. The food storage device of claim 13, further comprising:
   a humidifier in communication with said interior area to selectively maintain said interior area at a given humidity level; and
   a humidity sensor in communication with said interior area and said humidifier to selectively actuate said humidifier to maintain said interior area at said given humidity level.

15. The food storage device of claim 8, further comprising means for selecting said given pressure.

16. The food storage device of claim 8, further comprising:
   a pressure equalizing valve in communication with said interior area and an area external to said housing to selectively equalize a pressure inside said interior area with a pressure outside said interior area, said pressure equalizing valve being operatively accessible to a user when said door is at said closed configuration;
   a circuit-breaking switch in communication with said vacuum pump and said pressure equalizing valve for rendering said vacuum pump inoperable while said pressure equalizing valve is actuated;
   a circuit-breaking switch in communication with said vacuum pump and said door to render said vacuum pump inoperable while said door is at said open configuration;
   an ultraviolet light inside said housing for killing germs inside said housing;
   a humidifier in communication with said interior area to selectively maintain said interior area at a given humidity level;
   a humidity sensor in communication with said interior area and said humidifier to selectively actuate said humidifier to maintain said interior area at said given humidity level;
   means for selecting said given pressure; and
   means for selecting said given humidity level.

* * * * *